United States Patent [19]

Barlage

[11] 4,202,415
[45] May 13, 1980

[54] SOIL CULTIVATING MACHINE

[75] Inventor: Bruno Barlage, Riesenbeck, Fed. Rep. of Germany

[73] Assignee: H. Niemeyer Söhne GmbH & Co. KG, Riesenbeck, Fed. Rep. of Germany

[21] Appl. No.: 966,727

[22] Filed: Dec. 5, 1978

[30] Foreign Application Priority Data

Aug. 14, 1978 [DE] Fed. Rep. of Germany ....... 2835635

[51] Int. Cl.² ............................................. A01B 71/00
[52] U.S. Cl. ................................... 172/125; 172/47; 172/60; 172/97; 172/102; 172/118
[58] Field of Search ...................... 172/125, 35, 42, 43, 172/47, 48–61, 110, 111, 118–124, 97, 101, 102

[56] References Cited

U.S. PATENT DOCUMENTS

| | | | |
|---|---|---|---|
| 1,506,755 | 9/1924 | Keim | 172/125 UX |
| 2,299,334 | 10/1942 | Matter | 172/125 X |
| 2,638,830 | 5/1953 | Kropp | 172/125 X |
| 3,971,445 | 7/1976 | Lely | 172/125 X |
| 4,042,040 | 8/1977 | Lely | 172/125 |
| 4,068,722 | 1/1978 | Guelennec | 172/125 X |

Primary Examiner—Paul E. Shapiro
Attorney, Agent, or Firm—Sprung, Felfe, Horn, Lynch & Kramer

[57] ABSTRACT

A machine for cultivating the soil has a main transverse beam carrying a transverse tool shaft, and a gear box for driving the tool shaft. The beam has a frame for attaching the machine to the conventional three-point hydraulic system of a tractor, the tractor power take-off shaft then being connected to drive the tool shaft via the gear box. To enable the machine to be constructed in various widths and to facilitate its assembly and transportation, the main beam is in two half portions interconnected by the gear box housing. Likewise the tool shaft is in half shaft portions driven by a common, hollow gear box drive shaft. The gear box itself is formed in upper and lower portions, the upper portion of which is interchangeable with a different gear ratio portion to suit different tractor power take-off speeds. The gear box drive shaft has a rearwardly projecting drive shaft portion for driving further equipment to be used in combination with the machine.

3 Claims, 7 Drawing Figures

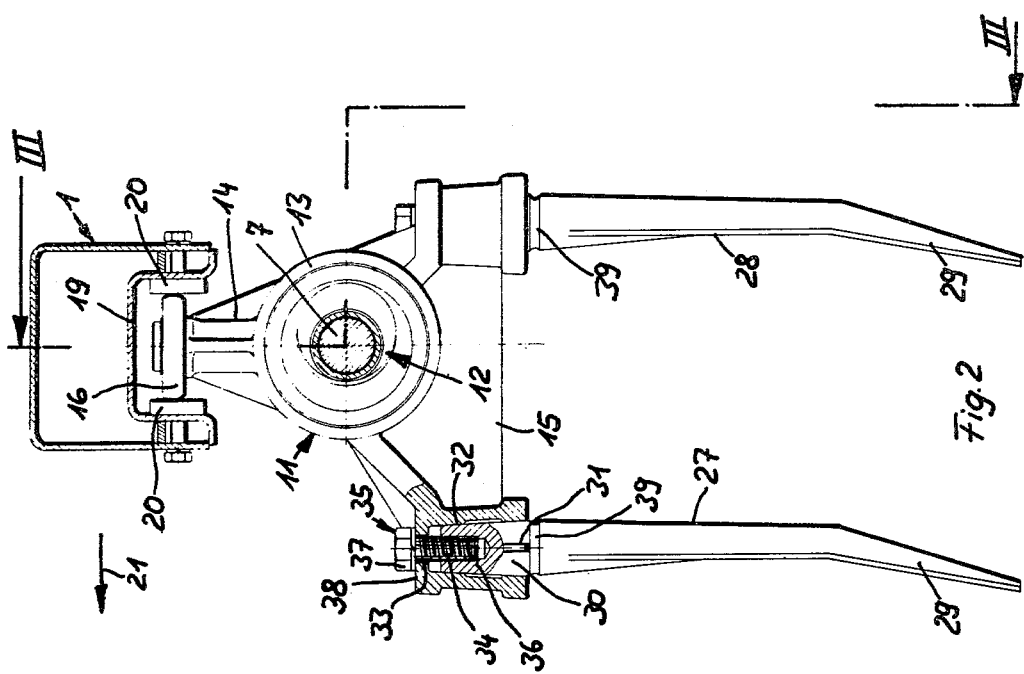
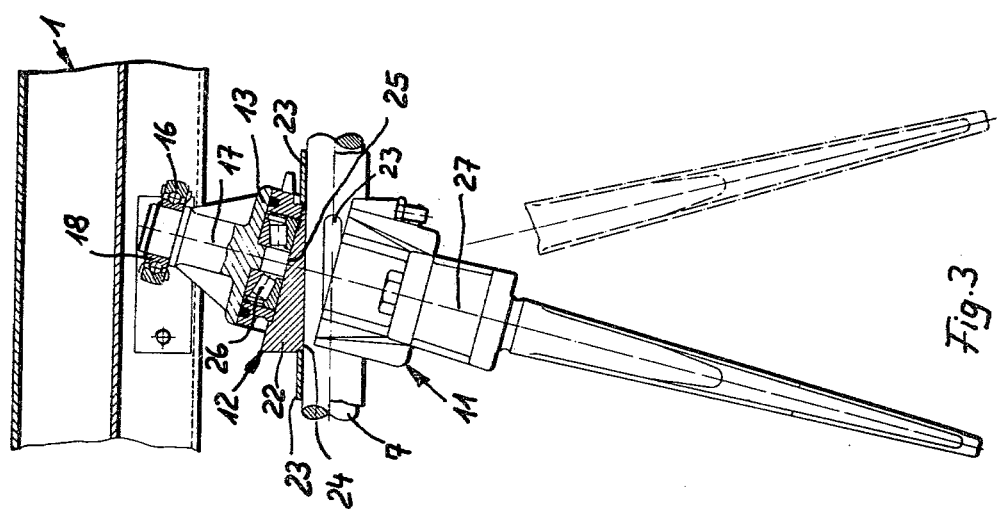

SOIL CULTIVATING MACHINE

BACKGROUND OF THE INVENTION

The present invention relates to a machine for cultivating the soil.

In a known soil cultivating machine, there is provided a main beam, intended to extend substantially horizontally and transversely with respect to the intended direction of travel of the machine, the main beam being constructed as a structural unit continuous over its length and having a gear box flange-mounted centrally on its underside, the gear box comprising a driving shaft extending horizontally in the intended direction of travel and driving a transverse tool shaft.

With this construction, the main beam, the tool shaft and the gear box are formed as separate components each dimensioned to suit the given machine design. Accordingly, where the machines are required to be made in different working widths and for use with tractors having different power take-off speeds, this makes machine production, and the stocking of spare parts, considerably more difficult and expensive.

Particular problems arise in the production of machines having a large working width with a correspondingly large number of soil cultivating tools and requiring a correspondingly high power input to drive them. The known construction of soil cultivating machine referred to above and having its driving shaft projecting well forward of the main beam has its centre of gravity disposed a considerable distance from the tractor, which is undesirable when the machine is combined with other implements inasfar as this increases the tilting moment to be taken up by the tractor, resulting from the combined weight of the equipment, tending to lift the front wheels of the tractor.

SUMMARY OF THE INVENTION

The present invention provides a machine for cultivating the soil comprising a main beam intended to extend substantially horizontally and transversely with respect to the direction of travel of the machine, and a tool shaft mounted parallel to, and with spacing below, the main beam in which the main beam and the tool shaft are each composed of two portions and, mounted between the portions of the main beam and the tool shaft, is a gear box which in turn is composed of an upper gear box portion and a lower gear box portion, of which the upper gear box portion has a driving shaft extending in the intended direction of travel of the machine and a generally vertically extending driven shaft engaging in the lower gear box portion, and of which the lower gear box portion has an upper, hollow, driven shaft receiving the driven shaft of the upper gear box portion and a horizontal, hollow, driven shaft aligned transversely with the tool shaft portions and drivably receiving the inner end portions of the tool shaft portions.

Preferably, the upper gear box portion is removably assembled with respect to the lower gear box portion and the remainder of the machine such that the upper gear box portion may be exchanged, as a whole, with a different upper gear box portion.

Preferably also, the upper gear box portion comprises a through drive shaft having a driving end portion at each end, one projecting forwardly of the gear box and the other rearwardly of the gear box.

The division of the main beam and of the tool shaft into half portions leads to a considerable simplification in the production of the machines both of a comparatively small and of a comparatively large working width. The machines can be assembled on the unit principle which facilitates and cheapens not only the formation and production of the parts themselves but also their assembly. The construction also facilitates transporting the machines which can be supplied to the customer or dealer in the semi-assembled state by the manufacturer. Apart from a simplification and cheapening of the storage of spare parts, the cost of spare parts is also reduced in the event of damage to the components. As a result of the adoption of a central gear box disposed between half portions of the main beam for example and half portions of the tool shaft, in conjunction with the formation of the gear box itself, there is a shifting back of the driving shaft which is connected to the tractor power take-off, in relation to the main beam with the result that the distance of the centre of gravity of the machine from the tractor is reduced with beneficial results. The formation of the gear box itself makes it possible, while using only two different upper gear box portions, to adapt a machine gear box for different power take-off speeds. The gear box can be constructed to operate in an oil bath, which is generally not possible in gear boxes with interchangeable gears. Furthermore, the division of the gear box into two gear box portions or units makes it possible to provide a through drive shaft in a simple manner from which the drive for further equipment, can be taken off. This leads to a considerable simplification when the machine is used in a combination.

The present invention will now be described by way of example, and not by way of limitation, with reference to the accompanying drawings in which:

BRIEF DESCRIPTION OF THE DRAWINGS

FIG. 2 is a view in a simplified section on line II—II in FIG. 1;

FIG. 3 is a broken away view in partial section on line III—III in FIG. 2;

DETAILED DESCRIPTION OF THE INVENTION

Figure 1:
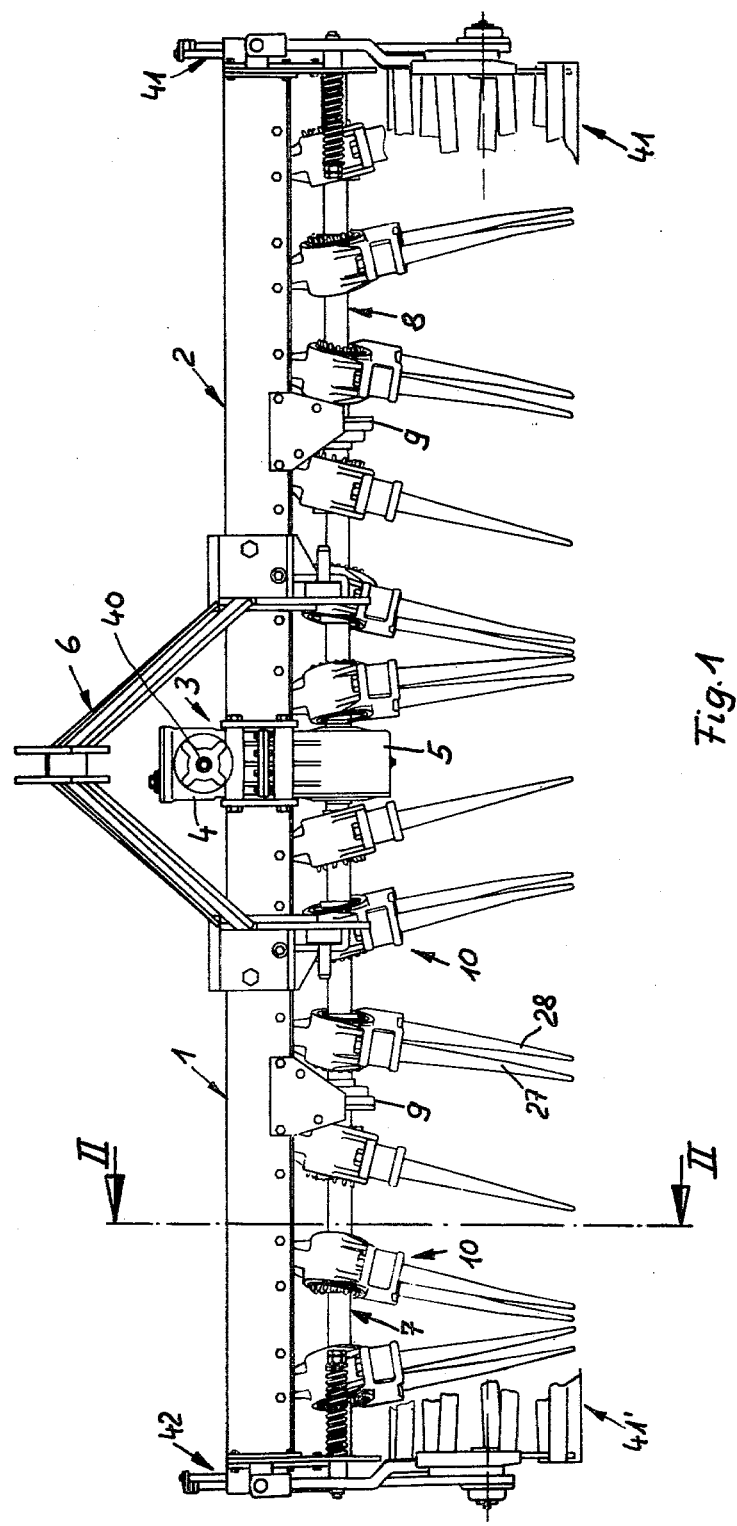
FIG. 1 is a diagrammatic general front view of a machine according to the present invention.
Figure 4:
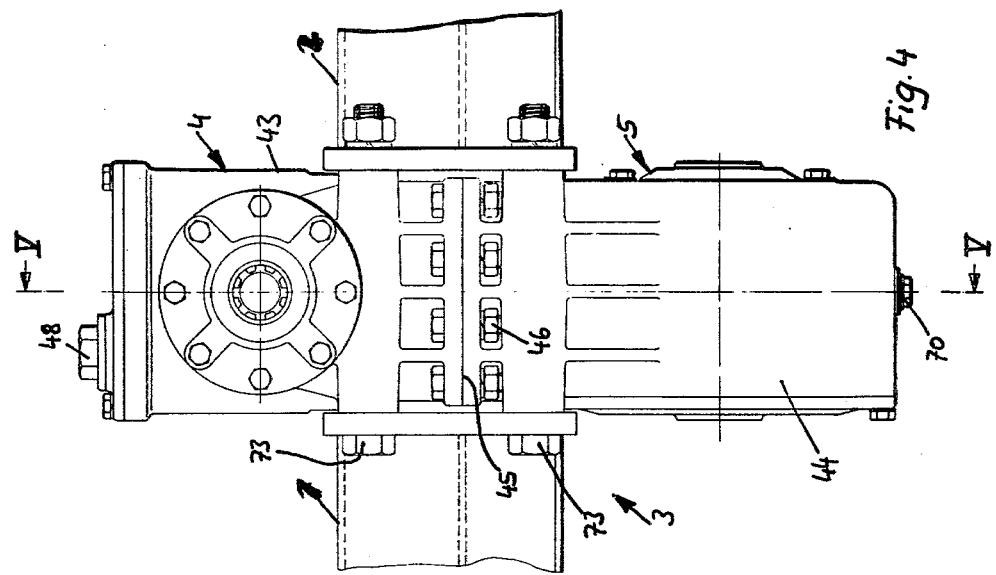
FIG. 4 is an enlarged front view of the central gear box of the machine.

With reference now to FIGS. 1-31, the machine comprises a main beam which extends substantially horizontally and transversely to the direction of travel, with spacing above the plane of the ground, and which consists of two half portions 1, 2. Flange-mounted between the adjacent ends of the half portions 1, 2 of the main beam is a central gear box 3 which in turn consists of an upper gear box portion 4 and a lower gear box portion 5. The main beam 1, 2 is connection to a connecting frame 6 for attachment to a three-point hydraulic system of an agricultural tractor.

Disposed with spacing below, and parallel to the main beam 1, 2, is a transverse tool shaft which in turn consists of two half portions 7, 8. The half portions 7 and 8 of the shaft are each mounted for rotation in outer bearings at their outer ends and in intermediate bearings 9 intermediate their ends and receive their rotary drive motion from the central gear box 3, to the lower gear box portion 5 of which the adjacent inner end portions of the shaft half portions 7, 8 are connected.

Tool units 10 are mounted side by side, with spacing, on the tool shaft 7, 8. These tool units each consist essentially of a tool carrier 11 of lever-like construction which is mounted on a wobble bearing 12 through which the tool shaft engages. Each tool holder 11 is a one piece casting comprising an annular member 13 with an upwardly extending lever arm 14 and a downwardly extending foot portion 15.

Mounted for free rotation about a central spindle 17 at the upper free end of the lever arm 14 of the tool holder 11 is a guide roller 16 which is formed from the outer race of a ball bearing which is located by its inner race 18 on the lever arm 14. The outer surface of the guide roller 16 is part-spherical and rolls in a guide channel 19 formed in the underside of the main beam 1, 2. This guide channel 19 extends along the main beam parallel to, and centrally below, the tool shaft 7, 8. The opposite guide surfaces of the guide channel 19 are formed by inserts 20 which are replaceable as wearing parts.

The mutual spacing of the guide surfaces of the inserts 20 corresponds substantially to the maximum external diameter of the guide rollers 16 but exceeds this, however, to just such an extent that when the guide rollers 16 roll on the front or rear insert 20, transverse to the direction of travel 21, no jamming of the guide rollers occurs but instead the rollers roll freely on relevant guide surfaces.

The wobble bearings 12 each comprise a wobble bush 22 which is fixedly located on the tool shaft 7, 8 by means of attachment members 23. Each wobble bush has an oblique bore 24 to receive the tool shaft but offers a cylindrical peripheral surface 25 which extends co-axially with spacing inside the inner surface of the annular member 13 of the tool holder 11. Provided between the peripheral surface 25 of the wobble bush 22 and the inner surface of the annular member 13 of the tool holder 11 is a taper roller bearing 26. The transverse central plane 27 of the tool holder 11 extends perpendicular to the peripheral surface 25 of the wobble bush 22.

Although the tool units 10 are alike in construction, nevertheless the wobble bushes 22 of adjacent tool units are offset angularly in relation to one another in the peripheral direction of the tool shaft. This results in the offset alignment of the transverse central planes 27 of the tool holders 11, as illustrated in FIG. 1. The machine is equipped with a total of twelve tool units. The angle of offset of the wobble bushes 22 is chosen so that, on rotation of the half portions 7, 8 of the tool shaft, a kinetic balance of the moving tool units is achieved. When the machine is in operation, the tool units 10 execute a pendulum motion in a direction substantially transverse to the direction of travel 21, and, during this pendulum motion, the tips of the tines 27, 28 secured to the underside of the tool holders 11, each travel round a closed curved path which resembles an ellipse in plan view, the major axis of which is aligned parallel to the tool shaft, and is comparatively large, and the minor axis of which extends parallel to the direction of travel 21, and is comparatively small. As can be seen from FIG. 3, with the construction of the wobble bushes 22 as illustrated, there is a maximum amplitude of pendulum motion transverse to the direction of travel, which corresponds to the travel of the tine tips from the one end position, illustrated in full lines, to the other end position, illustrated in broken lines, in this Figure. This amplitude of pendulum motion is designed in relation to the mutual spacing of the tool units 10 along the shaft 7, 8 so that the working passes of the tines 27, 28 of adjacent tool units 10 in the ground overlap one another or are at least contiguous so that all the ground is worked.

The tines 27, 28 are alike and consist of spring steel. The tines are individually forged in one piece. They are of curved configuration inasfar as they have a bent lower tip region 29 which is directed either in the direction of travel 21 or directly counter to this, according to the mounting. In the former case, pulling of the tines into the ground is encouraged, while in the latter case, pressing of ground vegetation into the soil is intensified. Furthermore, each tine has an upper end portion which is constructed in the form of a head pin tapering upwards. The tapered head pin 30 has at least one radially projecting locking projection 31 integral therewith. Each tine 27, 28 is secured direct to its tool holder 11. For this purpose, the foot portion 15 of the tool holder 11 comprises bores 32 which are provided in thickened regions thereof, and which open downwards, these bores tapering upwardly, corresponding to the head pins 30 and having a groove or grooves to receive the locking projection(s) 31. The bores 32 are shouldered towards the top to present smaller diameter cylindrical bore portions 33 through which threaded shanks 34 of bolts 35 are introduced to secure the tines in the tool holders. The threaded shanks 34 are screwed into internally threaded bores 36 provided co-axially in the head pins 30 of the tines 27, 28. The head 37 of each bolt 35 rests on an upper supporting surface 38 of the tool holder 11 with the result that when the bolt 35 is tightened, the head pin 30 is located positively and frictionally in its bore 32. The locking projection(s) 31 form an additional securing means preventing rotation of the tines in the bores 32 and act also as an alignment aid when inserting each head pin 30 into its bore 32.

Provided below the head pin 30 of each tine 27, 28 is a groove 39 which extends at least part way round and preferably all round the tine and which defines a predetermined breaking section. The breaking force required to break the tine at the predetermined breaking section is adjusted by appropriate dimensioning of the groove 39 so that the tine can break off under a given loading. Broken tines can be replaced quickly and easily with spares.

A pair of bores 32 is provided in each tool holder 11 and the bores are disposed one behind the other, with spacing, in the direction of travel 21, in the central plane 27 of each tool holder. The front bore 32 is situated below and in front of the transverse driving shaft 7, 8 in the direction of travel 21 and the rear bore 32 is situated below and behind the tool shaft 7, 8 in the direction of travel 21, as best seen in FIG. 2. Adjacent tool holders 11 are mounted so that their front and rear bores respectively are offset from one another in the direction of travel.

The height of the machine with respect to the ground to be cultivated is adjusted by means of the three-point hydraulic system of the tractor, from which the drive to a front driving shaft 40 of the central gear box 3 is also effected via a universally-jointed shaft. The machine can, however, be supported directly on the ground by means of supporting wheels or by means of a trailing, levelling roller, indicated at 41 in FIG. 1, which is supported from the ends of the main beam 1, 2 for adjustment in height, through a servo drive 42, and which is mounted for free rotation about a horizontal shaft, behind the tool units.

Referring now to FIGS. 4–7, the upper gear box portion 4 and the lower gear box portion 5 form structural units which can be assembled and separated from one another and the casings 43, 44 which adjoin one another in a horizontal joint plane 45 at which they are rigidly connected to one another by means of bolts 46. The casing 43 of the upper gear box portion 4 comprises cover 47 attached to it by screws, the cover having an oil filler 48. The upper gear box portion shown in FIG. 5 differs from that shown in FIG. 6 substantially only in its gear ratio, so that the same reference numerals are used to indicate the corresponding parts in both of these Figures.

The upper gear box portion comprises a horizontal driving shaft 49, disposed parallel to the direction of travel, and having a splined end portion 50 for connection to a tractor power take-off. The driving shaft 49 is constructed in the form of a through drive shaft and accordingly comprises an additional splined end portion 51 to the rear of the casing 43, and to which, for example, a universal-drive shaft for a following or combination implement can be connected. The drive shaft end portions 50, 51 usually have a wedge profile. Inside the casing 43, towards the rear, in the direction of travel, and fixedly mounted on the driving shaft 49 by means of a key 53, there is a bevel gear 52. The bearings for the driving shaft 49 are illustrated at 54 and 55. Further mounted by means of a bearing 56 in the casing 43 of the upper gear box portion is a vertical driven shaft 57 which in turn fixedly carries a counter bevel gear 58 which meshes with the bevel gear 52. The driven shaft 57 comprises a lower end portion 59 projecting downwards beyond the joint plane 45 and which engages in the lower portion 5 of the gear when the gear portions are assembled. This lower portion 59 may be splined or it may be provided with a keyway for a key 60.

Mounted in the casing 44 of the lower gear box portion 5, by means of a bearing 62, is a vertical, upper, hollow shaft 61 in which the driven lower portion 59 of the shaft 57, engages when the gear box portions are assembled together and to which this is drivingly connected by the key 60. In the example illustrated, the upper hollow shaft 61 is constructed in the form of a bevel gear 63. This bevel gear 63 meshes with a counter bevel gear 64 which is formed integrally with a horizontal, hollow shaft 65 aligned transversely with respect to the direction of travel 21. The hollow shaft 65 is splined internally and opens at both ends. Inserted in the ends of the shaft 65 are the adjacent inner end portions of the half portions 7, 8 of the transverse driving shaft which are correspondingly externally splined. The hollow shaft 65 is mounted in the casing 44 on bearings 66, 67 which are supported on the outside by a sleeve portion 68 of the casing 45 extending forwardly from the rear wall of the casing 44. The sleeve portion 68 is connected to the main portion of the casing 44 by radial struts 69 (see FIG. 5). Apart from this, the casing 44 comprises an oil drain hole 71 normally closed by a screw plug 70.

Figure 5:
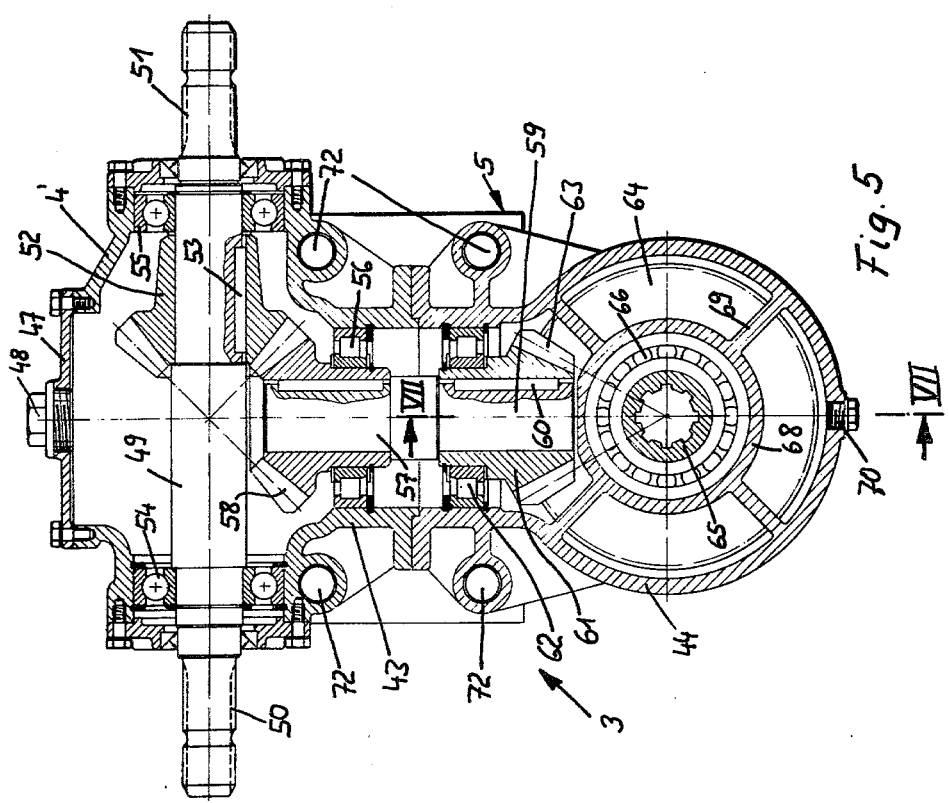
FIG. 5 is a section on line V—V in FIG. 4.
Figure 7:
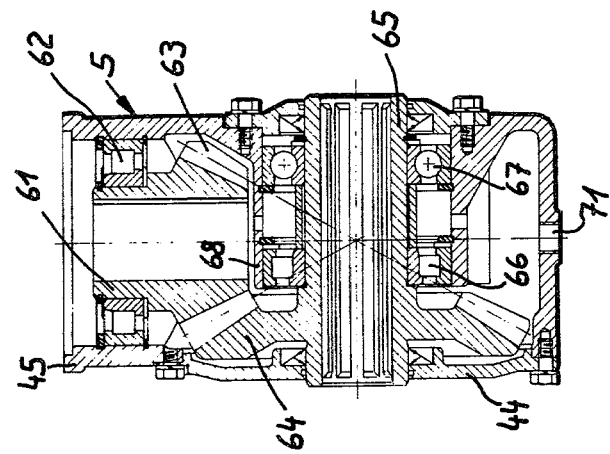
FIG. 7 is a section through the lower gear box portion on line VII—VII in FIG. 5.
Figure 6:
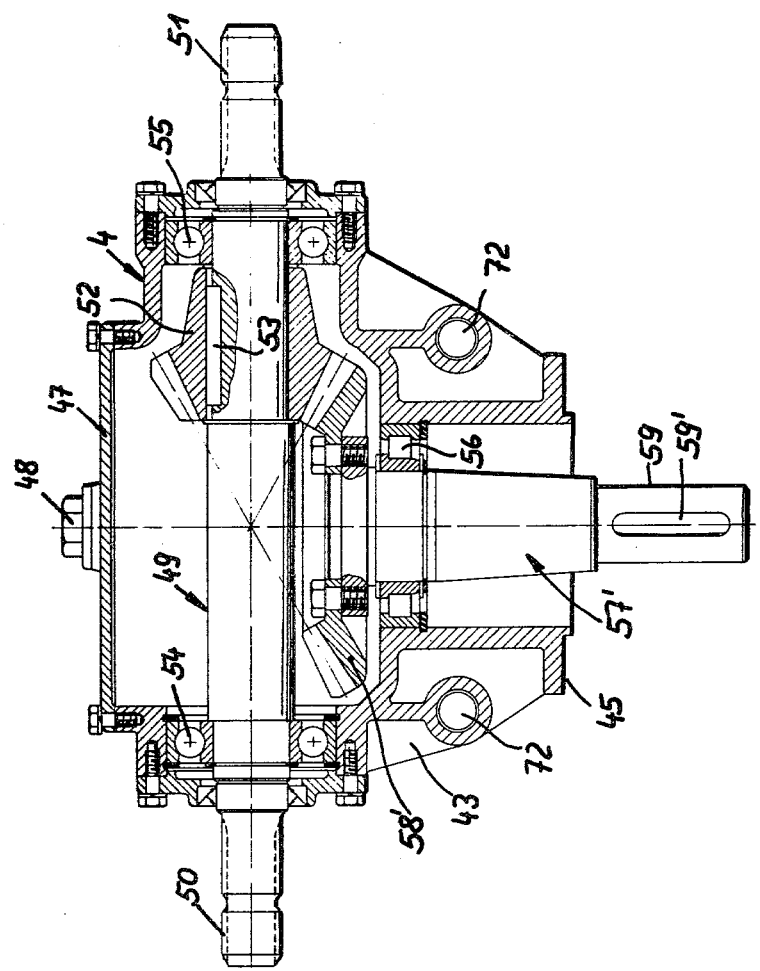
FIG. 6 is a detail illustration of a modified upper gear box portion illustrated in section, as in FIG. 5.

The lower gear portion has a construction which remains unaltered, regardless of whether it is united with an upper gear portion as shown in FIG. 5 or an upper gear portion as shown in FIG. 6. The construction of the upper gear portion shown in FIG. 6 differs from that in FIG. 5 only in the provision of a modified counter bevel gear 58' which is attached by screws to an only slightly modified shaft 57'. Whereas the upper gear portion shown in FIG. 5 has a gear ratio of about 1:1, the upper gear portion of FIG. 6 has a gear ratio of about 2:1. This takes into consideration the driven speeds of tractor power take-offs which are commonly either 1000 r.p.m. or 540 r.p.m. respectively. Both the casing 43 and the casing 44 comprise through bores 72 at both sides, aligned transversely to the direction of travel, which serve for the passage of bolts 73 by means of which the half portions 1, 2 of the main beam are flange-mounted on the casing of the central gear box 3.

It will be understood that the specification examples are illustrative but not limitative of the present invention and that other embodiments within the spirit and scope of the invention will suggest themselves to those skilled in the art.

What is claimed is:

1. A machine movable in a given direction of travel for cultivating the soil comprising a main beam extending substantially horizontally and transversely with respect to the direction of travel of the machine, and a tool shaft mounted parallel to spaced below the main beam, wherein the main beam and the tool shaft each comprise of two portions and a gear box mounted between the portions of the main beam and the tool shaft, and comprising an upper gear box portion and a lower gear box portion wherein the upper gear box portion includes a driving shaft extending in the direction of travel of the machine and a generally vertically driven shaft extending into the lower gear box portion, and driven by the driving shaft and wherein the lower gear box portion includes an upper, hollow, driven shaft receptive of the driven shaft of the upper gear box portion and a horizontal, hollow, driven shaft aligned transversely with the tool shaft portions and drivably receptive of the inner end portions of the tool shaft portions.

2. A machine as claimed in claim 1 further comprising means for releasably connecting the upper gear box portion as a unit to the lower gear box portion and the remainder of the machine whereby the upper gear box portion may be exchanged, as a unit, with a different upper gear box portion.

3. A machine as claimed in claim 1 in which the driving shaft comprises a through drive shaft having a driving end portion at each end, one projecting forwardly of the gear box and the other rearwardly of the gear box.

* * * * *